(12) United States Patent
Muramatsu et al.

(10) Patent No.: US 11,149,619 B2
(45) Date of Patent: Oct. 19, 2021

(54) INSTALLATION STRUCTURE OF EXHAUST GAS SENSOR

(71) Applicant: SUZUKI MOTOR CORPORATION, Hamamatsu (JP)

(72) Inventors: Takayoshi Muramatsu, Hamamatsu (JP); Noriko Oshiro, Hamamatsu (JP)

(73) Assignee: SUZUKI MOTOR CORPORATION, Hamamatsu (JP)

(*) Notice: Subject to any disclaimer, the term of this patent is extended or adjusted under 35 U.S.C. 154(b) by 0 days.

(21) Appl. No.: 16/921,863

(22) Filed: Jul. 6, 2020

(65) Prior Publication Data
US 2021/0010408 A1 Jan. 14, 2021

(30) Foreign Application Priority Data
Jul. 11, 2019 (JP) .............................. JP2019-129182

(51) Int. Cl.
*F01N 13/00* (2010.01)
*F01N 11/00* (2006.01)
*F01N 13/18* (2010.01)

(52) U.S. Cl.
CPC ............ *F01N 13/008* (2013.01); *F01N 11/00* (2013.01); *F01N 13/1805* (2013.01); *F01N 2560/025* (2013.01)

(58) Field of Classification Search
CPC .... F01N 13/008; F01N 13/1805; F01N 11/00; F01N 2560/025; Y02T 10/40
See application file for complete search history.

(56) References Cited

U.S. PATENT DOCUMENTS

| | | | |
|---|---|---|---|
| 6,082,103 A * | 7/2000 | Sugiura | F01N 13/008 60/272 |
| 9,140,173 B2 * | 9/2015 | Nakamura | F02D 35/00 |
| 9,174,694 B2 * | 11/2015 | Nakamura | B62K 11/04 |
| 2002/0069643 A1 * | 6/2002 | Yoshizawa | F02D 41/1439 60/323 |

FOREIGN PATENT DOCUMENTS

JP 2017-206998 A 11/2017

* cited by examiner

*Primary Examiner* — Brandon D Lee
(74) *Attorney, Agent, or Firm* — Stein IP, LLC

(57) ABSTRACT

An installation structure of an exhaust gas sensor includes: two exhaust pipes on a downstream side of a multi-cylinder engine; a collecting pipe configured to collect the two exhaust pipes; and an exhaust gas sensor installed in the collecting pipe. Outlets of the two exhaust pipes are connected to the collecting pipe so as to be adjacent to each other. In the collecting pipe, the exhaust gas sensor is installed at a position away from the outlets of the two exhaust pipes in a direction orthogonal to a direction in which the outlets of the two exhaust pipes are adjacent to each other in a sectional view.

10 Claims, 9 Drawing Sheets

INSTALLATION STRUCTURE OF EXHAUST GAS SENSOR

CROSS-REFERENCE TO RELATED APPLICATIONS

This application is based on Japanese Patent Application (No. 2019-129182) filed on Jul. 11, 2019, the contents of which are incorporated herein by way of reference.

BACKGROUND

The present invention relates to an installation structure of an exhaust gas sensor.

There has been known that a feedback signal from an exhaust gas sensor is used to perform various processes such as an air-fuel ratio control of a straddle-type vehicle and a deterioration diagnosis of a catalyst (see, for example, Patent Literature 1). In the straddle-type vehicle described in Patent Literature 1, four exhaust pipes extending from an engine are connected to two collecting pipes and combined into two exhaust pipes, and the two exhaust pipes are combined into a single collecting pipe and connected to a catalyst case. The exhaust gas sensor is installed in the single collecting pipe, and a predetermined component of exhaust gas flowing into the collecting pipe from the two exhaust pipes is detected by the exhaust gas sensor.

Patent Literature 1: JP-A-2017-206998

The two exhaust pipes are connected to the single collecting pipe described above, but the exhaust gas sensor installed in the collecting pipe is installed close to one of the two exhaust pipes. Therefore, there is a problem that the predetermined component of the exhaust gas from the one exhaust pipe is mainly detected by the exhaust gas sensor, and the predetermined component of the exhaust gas from the other exhaust pipe is not accurately detected.

SUMMARY

The present invention has been made in view of such a point, and an object of the present invention is to provide an installation structure of an exhaust gas sensor capable of improving a detection accuracy of exhaust gas flowing into a collecting pipe from two exhaust pipes.

In order to solve the above-described problem, an installation structure of an exhaust gas sensor of an aspect of the present invention includes: two exhaust pipes on a downstream side of a multi-cylinder engine; a collecting pipe configured to collect the two exhaust pipes; and an exhaust gas sensor installed in the collecting pipe. Outlets of the two exhaust pipes are connected to the collecting pipe so as to be adjacent to each other. In the collecting pipe, the exhaust gas sensor is installed at a position away from the outlets of the two exhaust pipes in a direction orthogonal to a direction in which the outlets of the two exhaust pipes are adjacent to each other in a sectional view.

DESCRIPTION OF EMBODIMENTS

In an installation structure of an exhaust gas sensor according to an aspect of the present invention, two exhaust pipes are provided on a downstream side of a multi-cylinder engine, and the two exhaust pipes are connected to a collecting pipe so that outlets of the two exhaust pipes are adjacent to each other. In the collecting pipe, an exhaust gas sensor is installed at a position away from the outlets of the two exhaust pipes in a direction orthogonal to a direction in which the outlets of the two exhaust pipes are adjacent to each other in a sectional view. Since the exhaust gas sensor is separated from both of the two exhaust pipes, the exhaust gas sensor detects not only a predetermined component of the exhaust gas from one exhaust pipe but also a predetermined component of the exhaust gas from both exhaust pipes. A detection biased in the exhaust gas from the one exhaust pipe is suppressed, and a detection accuracy of the predetermined component of the exhaust gas by the exhaust gas sensor is improved. In addition, since it is not necessary to install the exhaust gas sensor for each exhaust pipe in order to improve the detection accuracy of the exhaust gas sensor, cost is reduced.

EMBODIMENT

Hereinafter, an embodiment will be described in detail with reference to the accompanying drawings. Here, an example in which the installation structure of an exhaust gas sensor according to the present embodiment is applied to a motorcycle as a straddle-type vehicle will be described, but an application object is not limited thereto. For example, the installation structure of an exhaust gas sensor may be applied to other straddle-type vehicles such as a buggy-type motor tricycle. In addition, in the following drawings, a front side of a vehicle body is indicated by an arrow FR, a rear side of the vehicle body is indicated by an arrow RE, a left side of the vehicle body is indicated by an arrow L, and a right side of the vehicle body is indicated by an arrow R, respectively.

Figure 1:
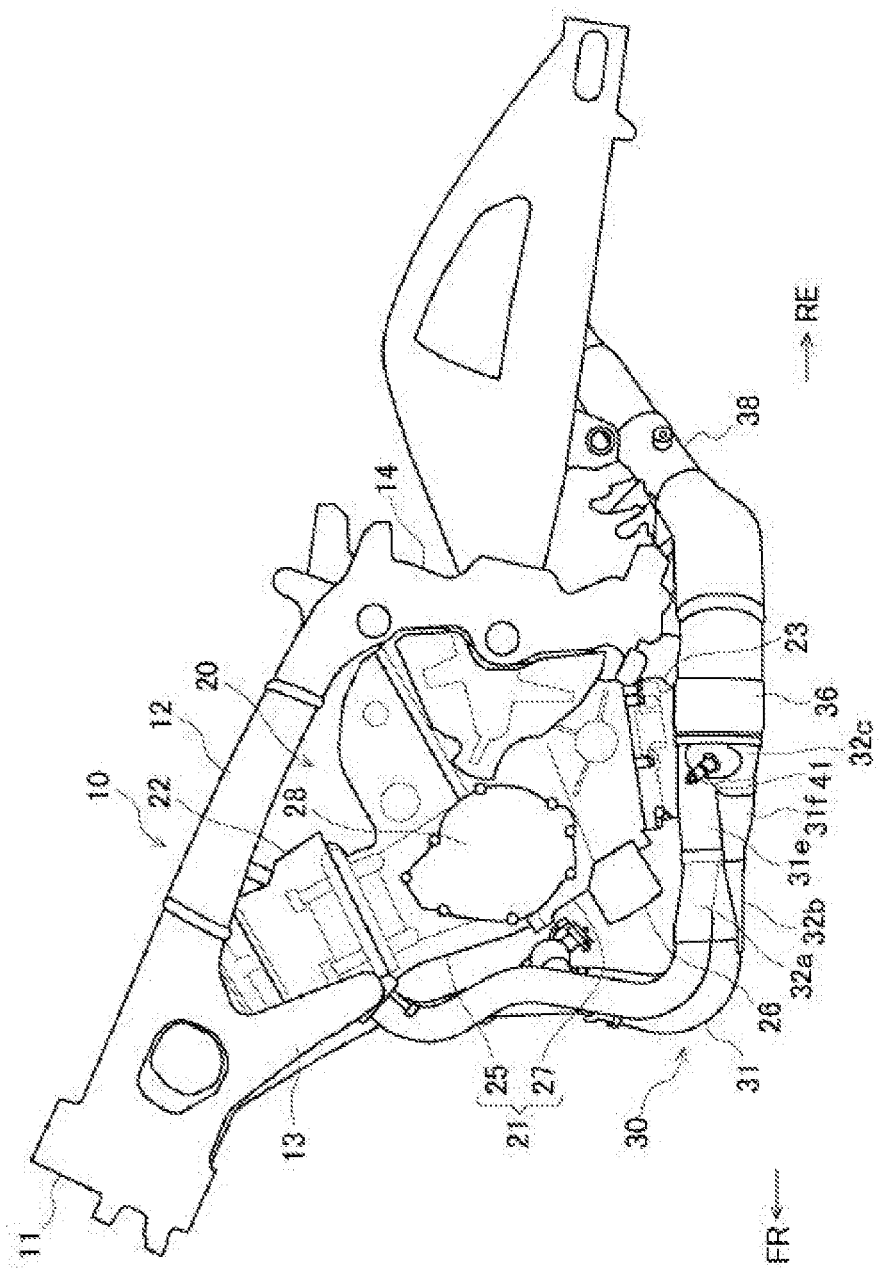
FIG. 1 is a side view of a periphery of an engine according to an embodiment.
Figure 2:
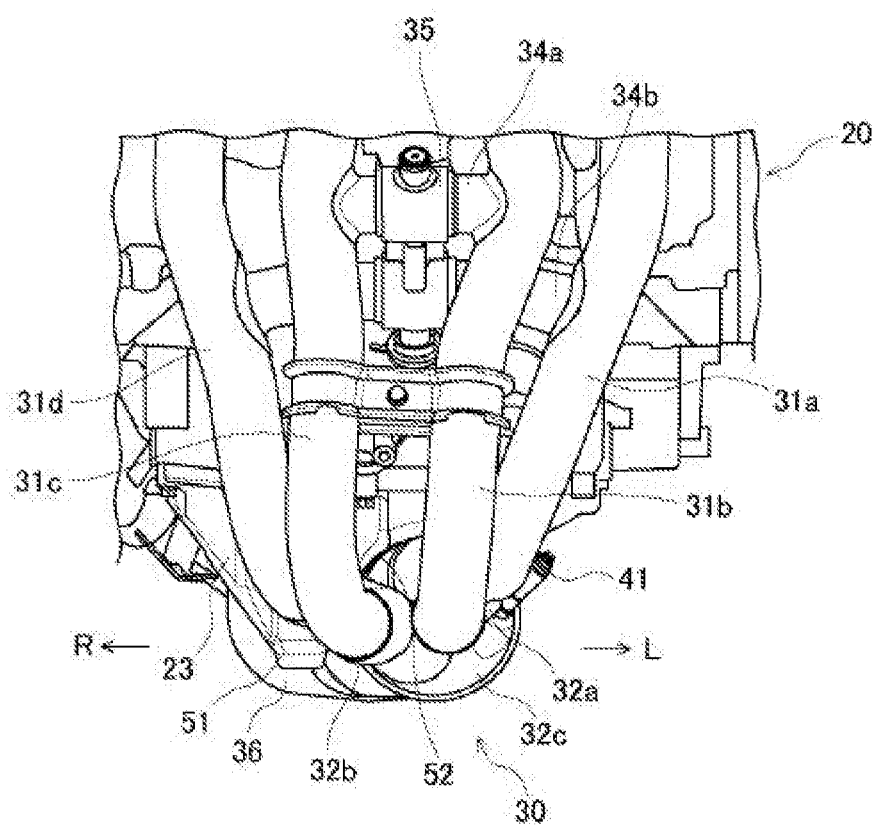
FIG. 2 is a front view of a lower portion of the engine according to the embodiment.
Figure 3:
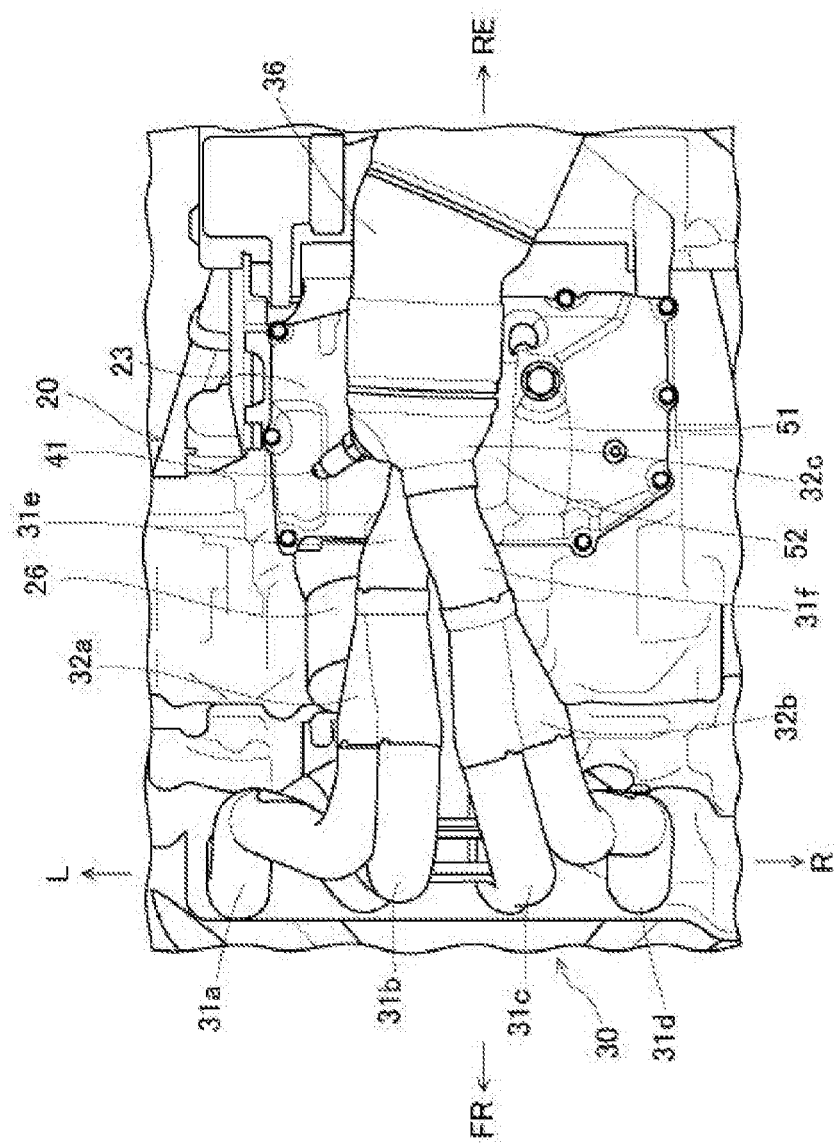
FIG. 3 is a bottom view of the lower portion of the engine according to the embodiment.

FIG. 1 is a schematic view of a periphery of an engine of a straddle-type vehicle according to the present embodiment. FIG. 2 is a front view of a lower portion of the engine according to the present embodiment. FIG. 3 is a bottom view of the lower portion of the engine according to the present embodiment. In FIG. 1, for convenience of explanation, a part of a configuration of the motorcycle will be extracted and described.

As shown in FIG. 1, a vehicle body frame 10 of the motorcycle includes a pair of main frames 12 that branch leftward and rightward from a head pipe 11 and extend rearward, and a pair of down frames 13 that branch leftward and rightward from the head pipe 11 and extend downward.

The pair of main frames 12 are curved so as to wrap around the rear of the engine 20, and a rear side of the engine 20 is supported by body frames 14 at rear portions of the respective main frames 12. The pair of down frames 13 protrude in a substantially triangular shape so that width thereof becomes narrower downward, and a front side of the engine 20 is supported by lower portions of the respective down frames 13.

The engine 20 is a multi-cylinder engine, and a cylinder head 22 is attached to an upper portion of an engine case 21, and an oil pan 23 for storing engine oil is attached to a lower portion of the engine case 21. The engine case 21 is formed to be dividable into upper and lower parts by an upper case 25 integral with a cylinder and a lower case 27 with an oil filter 26. Both left and right surfaces of the engine case 21 are partially open, and a magneto cover 28 that covers a magneto (not shown) is attached to the left opening, and a clutch cover (not shown) that covers a clutch (not shown) is attached to the right opening.

The engine 20 is provided with an intake device (not shown) for taking in air into the engine 20, a fuel supply device (not shown) for supplying the fuel, and an exhaust device 30 for discharging exhaust gas from the engine 20 as accessories. Air is taken into the engine 20 from the intake device, and the fuel is mixed with the air by the fuel supply device, and an air-fuel mixture is sent to a combustion chamber of the engine 20. The exhaust gas after combustion is discharged from a muffler (not shown) through a plurality of (four in the present embodiment) exhaust pipes 31a to 31d (see FIG. 2) and a catalyst case 36 of the exhaust device 30. The four exhaust pipes 31a to 31d extend downward from a front surface of the engine 20, and are combined into one and connected to the catalyst case 36.

More specifically, as shown in FIGS. 2 and 3, the four exhaust pipes 31a to 31d are connected to respective cylinders, and are bent rearward after extending downward from the front surface of the engine 20. The two left exhaust pipes 31a, 31b are connected to a collecting pipe 32a on a left front side of the oil pan 23 and are combined into one exhaust pipe 31e, and the two right exhaust pipes 31c, 31d are connected to a collecting pipe 32b on a right front side of the oil pan 23 and are combined into one exhaust pipe 31f. Further, the two exhaust pipes 31e, 31f extend rearward of the vehicle, and the two exhaust pipes 31e, 31f are connected to a collecting pipe 32c installed in a concave portion 52 to be described later of the oil pan 23, and are combined into one.

As described above, the four exhaust pipes 31a to 31d are combined into the two exhaust pipes 31e, 31f by the pair of collecting pipes 32a, 32b, and the two exhaust pipes 31e, 31f are combined into one by the collecting pipe 32c and connected to the catalyst case 36. In addition, among the exhaust pipes 31a to 31d, the two inner exhaust pipes 31b, 31c are connected by a communication pipe 34a extending in a vehicle width direction, and the two outer exhaust pipes 31a, 31d are connected by a communication pipe 34b extending in the vehicle width direction. An exhaust control valve 35 is provided in the communication pipes 34a, 34b, and the communication pipes 34a, 34b are opened and closed by the exhaust control valve 35.

The catalyst case 36 extends below the body frame 14 (see FIG. 1) toward the rear of the vehicle. Two front and rear catalysts 37 (only one shown in FIG. 6) are installed in the catalyst case 36 with the body frame 14 interposed therebetween. In the catalyst case 36, air pollutants such as carbon monoxide (CO), hydrocarbons (HC), and nitrogen oxides (NOx) contained in the exhaust gas are purified by the two front and rear catalysts 37. An exhaust control valve 38 (see FIG. 1) for adjusting a flow rate of the exhaust gas in accordance with a rotation speed of the engine 20 and a muffler for silencing exhaust sound of the exhaust gas are connected to a downstream side of the catalyst case 36. An oxygen sensor 41 is installed as an exhaust gas sensor in the collecting pipe 32c on an upstream side of the catalyst case 36.

The oxygen sensor 41 detects an oxygen concentration as a predetermined component of the exhaust gas and feeds back the detected oxygen concentration to an ECU (not shown) or the like. A detection value of the oxygen sensor 41 is used for various processes such as an air-fuel ratio control of the motorcycle and a deterioration diagnosis of the catalyst 37. Since the oxygen sensor 41 is installed in the collecting pipe 32c into which the four exhaust pipes 31a to 31d are combined, the number of components of the oxygen sensor 41 is reduced, and the cost is reduced. However, since the collecting pipe 32c is positioned at the lower portion of the engine, it is necessary to install the oxygen sensor 41 in the collecting pipe 32c in consideration of a vehicle layout such as the oil pan 23, the minimum ground clearance, and a bank angle.

Figure 4:
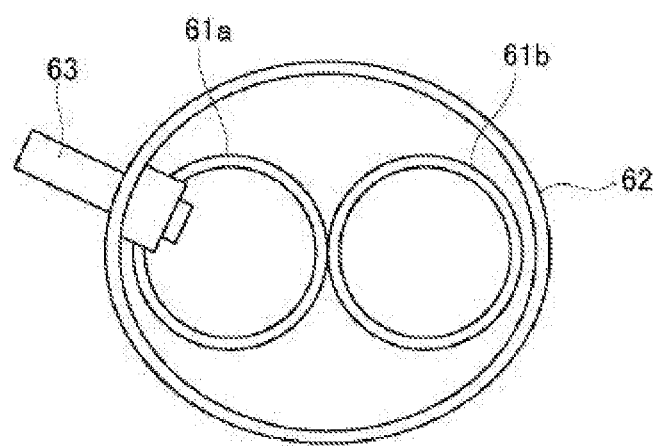
FIG. 4 is an explanatory view of an installation position of an oxygen sensor according to a comparative example.

In general, as shown in a comparative example of FIG. 4, since a pair of left and right exhaust pipes 61a, 61b are connected to a collecting pipe 62, an oxygen sensor 63 is installed in the collecting pipe 62 closer to one exhaust pipe 61a in view of the vehicle layout. Since the oxygen sensor 63 does not protrude in an upper-lower direction from the collecting pipe 62, constraint on the vehicle layout such as the minimum ground clearance is satisfied, but the oxygen concentration of the exhaust gas in the one exhaust pipe 61a has a strong effect on the detection value of the oxygen sensor 63, and the oxygen concentration of the exhaust gas in the other exhaust pipe 61b cannot be accurately detected. In particular, in recent years, emission gas regulation has become severe, and a high detection accuracy is required for the oxygen sensor 63.

Figure 6:
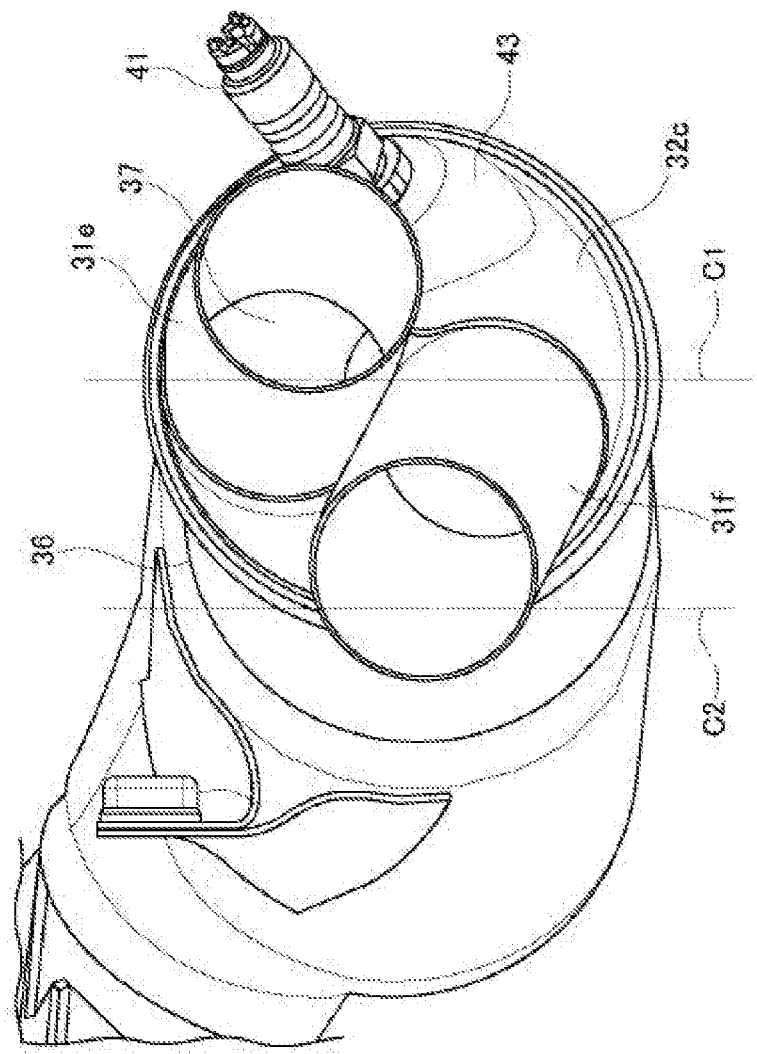
FIG. 6 is a view of an exhaust pipe near a catalyst case according to the embodiment as viewed from the front of a vehicle.

Therefore, in the present embodiment, the exhaust pipes 31e, 31f are connected to the collecting pipe 32c so as to be adjacent to each other in the upper-lower direction, and the oxygen sensor 41 is installed on a side of outlets of the exhaust pipes 31e, 31f in the collecting pipe 32c (see FIG. 6). Since the oxygen sensor 41 does not protrude in the upper-lower direction from the collecting pipe 32c and the oxygen sensor 41 is separated from both outlets of the exhaust pipes 31e, 31f, the exhaust gas from one of the exhaust pipes 31e, 31f is prevented from being concentrated on the oxygen sensor 41. Therefore, it is possible to improve the detection accuracy of the oxygen concentration of the exhaust gas by the oxygen sensor 41 while satisfying the constraint of the vehicle layout.

Figure 5:
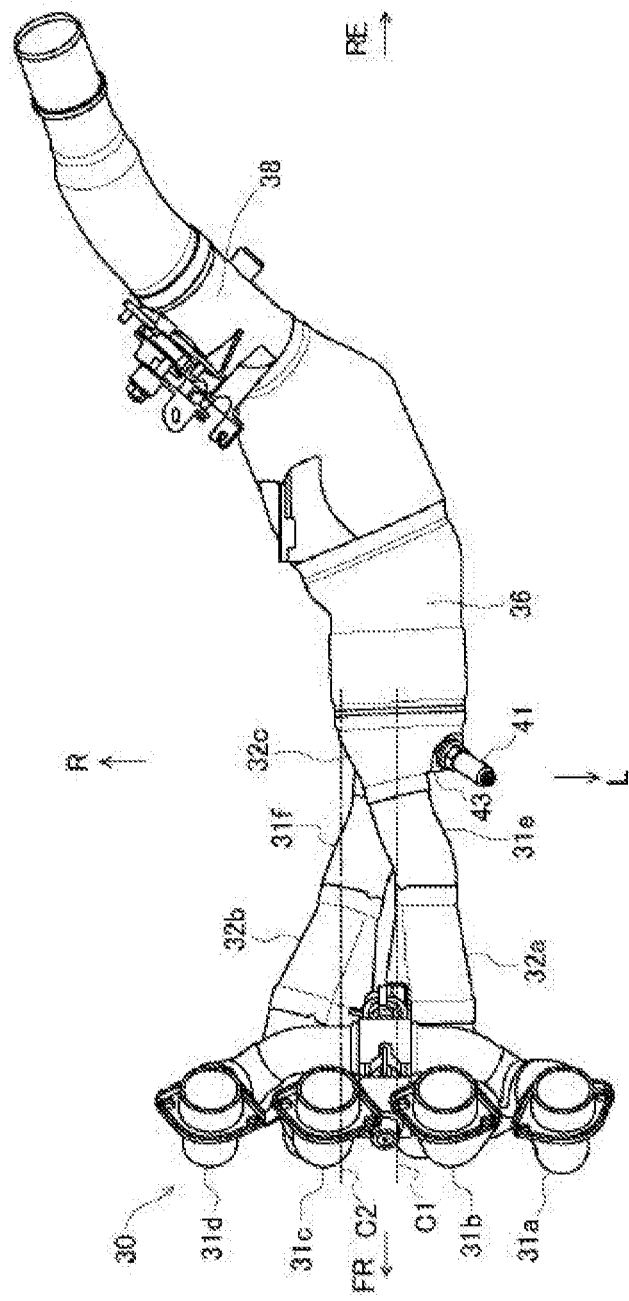
FIG. 5 is a top view of an exhaust device according to the embodiment.
Figure 7:
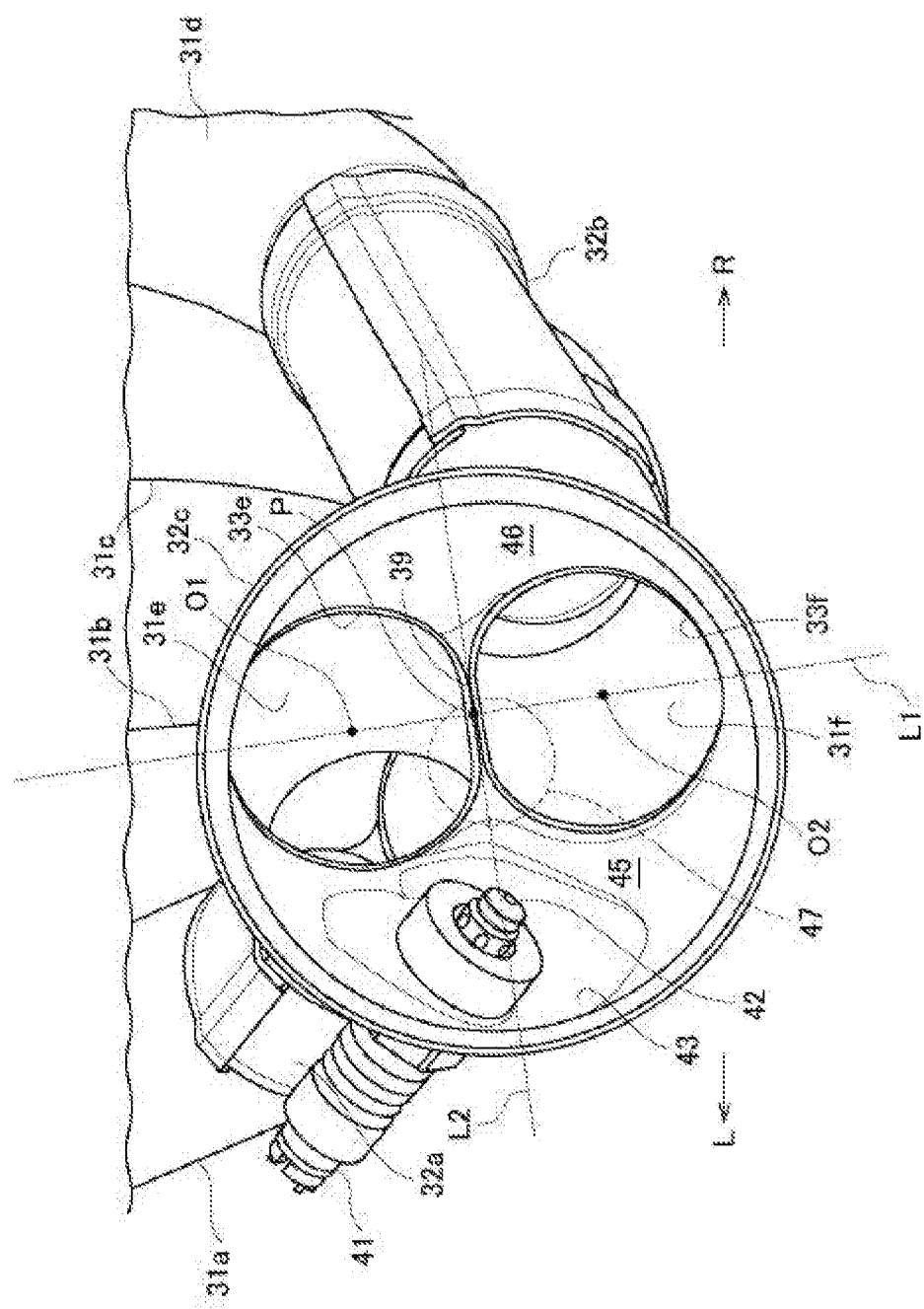
FIG. 7 is an explanatory view of an installation position of an oxygen sensor according to the embodiment.
Figure 8:
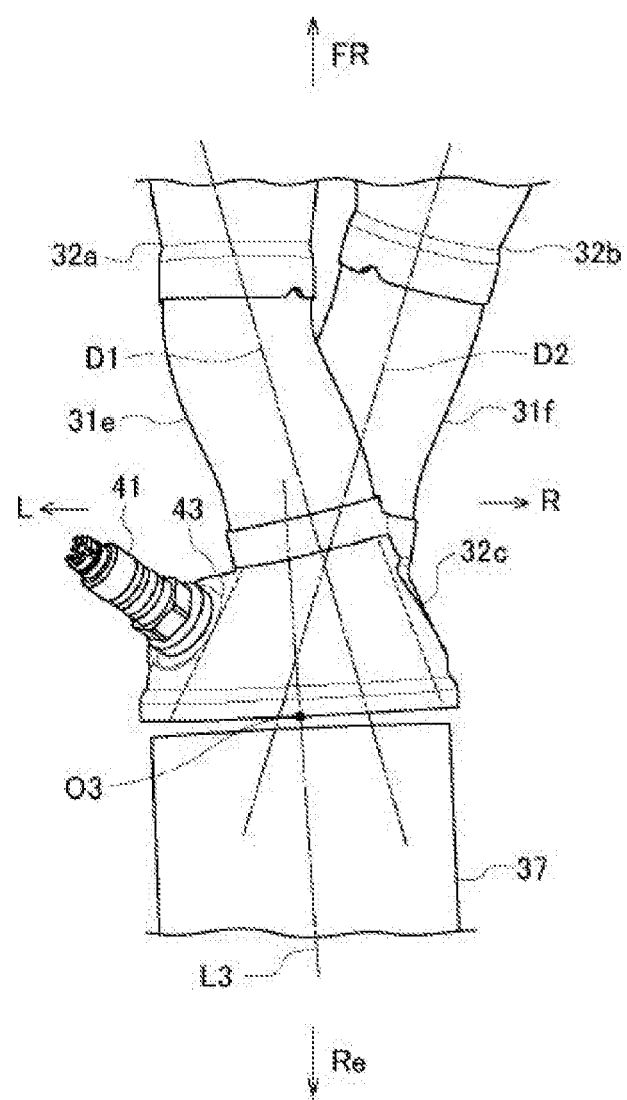
FIG. 8 is a view showing a relationship between the oxygen sensor and an exhaust direction according to the embodiment.

Hereinafter, the installation structure of the oxygen sensor will be described with reference to FIGS. 5 to 8. FIG. 5 is a top view of the exhaust device according to the present embodiment. FIG. 6 is a view of the exhaust pipe near the catalyst case according to the present embodiment as viewed from the front of the vehicle. FIG. 7 is an explanatory view of the installation position of the oxygen sensor according to the present embodiment. FIG. 8 is a view showing a relationship between the oxygen sensor and an exhaust direction according to the present embodiment.

As shown in FIG. 5, on the upstream side of the exhaust device 30, the four exhaust pipes 31a to 31d are arranged in front of the engine 20 in the vehicle width direction, and the two collecting pipes 32a, 32b are arranged in front of the oil pan 23 (see FIG. 3) in the vehicle width direction. Each of the collecting pipes 32a, 32b has a so-called monaka structure in which a right half body and a left half body are joined. An opening edge of an upstream end of each of the collecting pipes 32a, 32b is formed in an approximately 8 shape, and an opening edge of a downstream end of each of the collecting pipes 32a, 32b is formed in a circular shape. Each of the collecting pipes 32a, 32b is formed so as to combine two exhaust paths into one exhaust path from the upstream end toward the downstream end.

The two exhaust pipes 31a, 31b are connected to the opening edge of the upstream end of the left collecting pipe 32a, and one exhaust pipe 31e is connected to the opening edge of the downstream end of the collecting pipe 32a. The two exhaust pipes 31c, 31d are connected to the opening edge of the upstream end of the right collecting pipe 32b, and one exhaust pipe 31f is connected to the opening edge of the downstream end of the collecting pipe 32b. The downstream end of the left collecting pipe 32a is higher than the downstream end of the right collecting pipe 32b (see FIG. 1), and the exhaust pipe 31e on a downstream side of the collecting pipe 32a is positioned above the exhaust pipe 31f on a downstream side of the collecting pipe 32b. In this way, the four left and right exhaust pipes 31a to 31d are combined into two upper and lower exhaust pipes 31e, 31f.

As shown in FIGS. 5 and 6, the exhaust pipes 31e, 31f extend toward a center in the vehicle width direction and are connected to the collecting pipe 32c so as to be adjacent to each other in the upper-lower direction. The upper exhaust pipe 31e is connected to a center C1 of the collecting pipe 32c in the vehicle width direction, and the lower exhaust pipe 31f is connected to a position closer to a vehicle center C2 side than the center C1 of the collecting pipe 32c in the vehicle width direction. The collecting pipe 32c is installed so as to fit in the concave portion 52 (see FIG. 2) of the oil pan 23, and is formed in a substantially truncated cone shape whose diameter increases from the upstream side toward the downstream side. An opening edge of an upstream end of the collecting pipe 32c is formed in an approximately 8 shape, and an opening edge of a downstream end of the collecting pipe 32c is formed in a large-diameter circular shape.

The two exhaust pipes 31e, 31f are inserted into the opening edge of the upstream end of the collecting pipe 32c, and the collecting pipe 32c and the exhaust pipes 31e, 31f are joined by welding. Since the two exhaust pipes 31e, 31f are connected to the collecting pipe 32c so as to make the exhaust directions intersect, more appropriate welding can be performed, the connection of the exhaust pipes 31e, 31f with respect to the collecting pipe 32c is improved, and a pressure loss in a pipe path is reduced. The catalyst case 36 is connected to the opening edge of the downstream end of the collecting pipe 32c, and the exhaust gas that has passed through the collecting pipe 32c is introduced into the catalyst case 36. The catalyst 37 in the catalyst case 36 faces the outlets of the exhaust pipes 31e, 31f.

A bulging portion 43 bulging outward from an outer surface of the collecting pipe 32c is formed next to the opening edge on the upstream end side of the collecting pipe 32c. A space for diffusing the exhaust gas from the exhaust pipes 31e, 31f is formed inside the bulging portion 43. The oxygen sensor 41 is attached to the bulging portion 43, a detection end 42 (see FIG. 7) of the oxygen sensor 41 is positioned inside the bulging portion 43, and a base end side of the oxygen sensor 41 protrudes outward from the bulging portion 43. At this time, the detection end 42 of the oxygen sensor 41 is positioned on a left side of the outlets of the exhaust pipes 31e, 31f, and the detection biased in the oxygen concentration of the exhaust gas from one of the exhaust pipes 31e, 31f is suppressed.

In this case, as shown in FIG. 7, outlets 33e, 33f of the exhaust pipes 31e, 31f are adjacent to each other in the upper-lower direction in the collecting pipe 32c in a sectional view of the collecting pipe 32c cut in a radial direction. The outlet 33e of the exhaust pipe 31e is positioned substantially at a center of an upper half portion of the collecting pipe 32c, and the outlet 33f of the exhaust pipe 31f is positioned slightly closer to the right side than a center of a lower half portion of the collecting pipe 32c. That is, the expression that the outlets 33e, 33f of the exhaust pipes 31e, 31f are adjacent to each other in the upper-lower direction is not limited to a configuration in which the outlets 33e, 33f are completely adjacent to each other in a vertical direction, but also includes a configuration in which the outlets 33e, 33f are adjacent to each other in the substantially upper-lower direction slightly inclined with respect to the vertical direction. Outer edges of the outlets 33e, 33f of the exhaust pipes 31e, 31f are in contact with each other, and the detection end 42 of the oxygen sensor 41 is positioned on a left side of a contact portion 39.

More specifically, the outlets 33e, 33f of the exhaust pipes 31e, 31f are formed in the same diameter, and the detection end 42 of the oxygen sensor 41 is positioned on a straight line L2 extending perpendicularly from a middle point P on a center line L1 connecting a center O1 of the outlet 33e of the exhaust pipe 31e and a center O2 of the outlet 33f of the exhaust pipe 31E As a result, distances from the outlets 33e, 33f of the two exhaust pipes 31e, 31f to the detection end 42 of the oxygen sensor 41 become equal, and the exhaust gas from the exhaust pipes 31e, 31f uniformly hits the detection end 42 of the oxygen sensor 41. Therefore, the oxygen concentration of the exhaust gas discharged from the exhaust pipes 31e, 31f can be accurately detected by the oxygen sensor 41.

As described above, the collecting pipe 32c is provided with the bulging portion 43, and the oxygen sensor 41 is installed near a top surface of the bulging portion 43. Although the detection end 42 of the oxygen sensor 41 protrudes into the bulging portion 43, the radially outward bulging of the bulging portion 43 offsets a radially inner protruding amount of the detection end 42 (see FIG. 8). Therefore, the oxygen sensor 41 is installed in the collecting pipe 32c so as not to overlap with the outlets 33e, 33f of the exhaust pipes 31e, 31f. The flow of the exhaust gas discharged from the exhaust pipes 31e, 31f is not strongly inhibited by the oxygen sensor 41, and the pressure loss in the exhaust pipes 31e, 31f and the collecting pipe 32c can be reduced.

A left side (one) space 45 and a right side (the other) space 46 are formed in the collecting pipe 32c with the outlets 33e, 33f of the pair of upper and lower exhaust pipes 31e, 31f interposed therebetween. Although the outlet 33e of the exhaust pipe 31e is positioned at the center of the upper half portion of the collecting pipe 32c, the outlet 33f of the exhaust pipe 31f is positioned slightly closer to the right than the center of the lower half portion of the collecting pipe 32c, and therefore the left side space 45 in which the oxygen sensor 41 is installed is larger than the right side space 46. The exhaust gas discharged from the outlets 33e, 33f of the exhaust pipes 31e, 31f is easily mixed in the left side space 45 of the collecting pipe 32c, and the detection accuracy of the oxygen concentration of the exhaust gas by the oxygen sensor 41 is improved.

As shown in FIG. 8, the collecting pipe 32c has a diameter increasing from the upstream side toward the downstream side, and inclination of an enlarged diameter portion on the left side of the collecting pipe 32c is larger than inclination of an enlarged diameter portion on the right side of the collecting pipe 32c. That is, an inclination angle of the enlarged diameter portion on the left side of the collecting pipe 32c is larger than an inclination angle of the enlarged diameter portion on the right side of the collecting pipe 32c with respect to a front-rear direction of the vehicle. Accordingly, the exhaust gas easily flows from the outlets 33e, 33f of the exhaust pipes 31e, 31f (see FIG. 7) along the inclination of the enlarged diameter portion on the left side of the collecting pipe 32c, and the exhaust gas is diffused from the outlets 33e, 33f toward the oxygen sensor 41, so that the detection accuracy of the oxygen concentration of the exhaust gas by the oxygen sensor 41 is improved.

An exhaust direction D1 of the left exhaust pipe 31e is directed to the right side of the collecting pipe 32c, and an exhaust direction D2 of the right exhaust pipe 31f is directed to the left side of the collecting pipe 32c. That is, the exhaust pipes 31e, 31f are connected to the collecting pipe 32c such that the exhaust directions D1, D2 of the exhaust pipes 31e, 31f intersect with each other. As a result, the exhaust gas flowing into the collecting pipe 32c from the exhaust pipes 31e, 31f is easily mixed, and the detection accuracy of the oxygen concentration of the exhaust gas by the oxygen sensor 41 is improved. Incidentally, the exhaust directions D1, D2 are directions in which the exhaust gas is discharged from the outlets 33e, 33f through the exhaust pipes 31e, 31f.

As shown in FIG. 7, a central portion 47 of the catalyst 37 in the catalyst case 36 overlaps with the outlets 33e, 33f of the exhaust pipes 31e, 31f in a sectional view of the collecting pipe 32c. Further, as shown in FIG. 8, a center O3 on the downstream side of the collecting pipe 32c coincides with a center line L3 of the catalyst 37. Therefore, the exhaust gas flowing into the collecting pipe 32c from the exhaust pipes 31e, 31f is diffused, and the exhaust gas easily flows substantially uniformly from the collecting pipe 32c toward the catalyst 37. Therefore, the exhaust gas can easily flow uniformly inside the catalyst 37, and a catalyst material can be effectively used to purify the exhaust gas, so that early deterioration of the catalyst 37 can be suppressed.

Next, the vehicle layout will be described with reference to FIGS. 2 and 3.

As shown in FIGS. 2 and 3, the right side of a bottom surface of the oil pan 23 is a convex portion 51 formed at a deep bottom. The arch-shaped concave portion 52 is formed on the bottom surface of the oil pan 23 so as to be shallower toward the left side from the convex portion 51 of the oil pan 23. The collecting pipe 32c is positioned on the left side of the convex portion 51 of the oil pan 23, that is, on the concave portion 52 of the oil pan 23. The oxygen sensor 41 is provided on the left side of the collecting pipe 32c, and the base end side of the oxygen sensor 41 protrudes obliquely upward from the collecting pipe 32c to the left, so that interference between the base end side of the oxygen sensor 41 and the bottom surface of the oil pan 23 is suppressed.

Since the oxygen sensor 41 protrudes to an opposite side (the left side) to the convex portion 51 side of the oil pan 23, the oxygen sensor 41 is fitted in the concave portion 52 of the oil pan 23 in the vehicle width direction. Since the interference between the oxygen sensor 41 and the oil pan 23 is suppressed, the collecting pipe 32c does not largely protrude downward from the bottom surface of the oil pan 23, and a compact vehicle layout in which wiring of a lead wire of the oxygen sensor 41 is ensured becomes possible. Therefore, even when the exhaust pipes 31e, 31f are installed in the upper-lower direction, it is possible to improve the detection accuracy of the oxygen concentration of the exhaust gas by the oxygen sensor 41 while satisfying the constraint of the vehicle layout such as the minimum ground clearance and the bank angle of the motorcycle.

As described above, according to the present embodiment, since the oxygen sensor 41 is separated from both of the two exhaust pipes 31e, 31f, only the exhaust gas flowing into the collecting pipe 32c from one exhaust pipe does not hit the oxygen sensor 41, and the biased detection of the exhaust gas from the one exhaust pipe is suppressed. Therefore, the detection accuracy of the predetermined component of the exhaust gas by the oxygen sensor 41 can be improved. In addition, since it is not necessary to install the oxygen sensor 41 for each of the exhaust pipes 31e, 31f in order to improve the detection accuracy of the oxygen sensor 41, the cost can be reduced.

Figure 9:
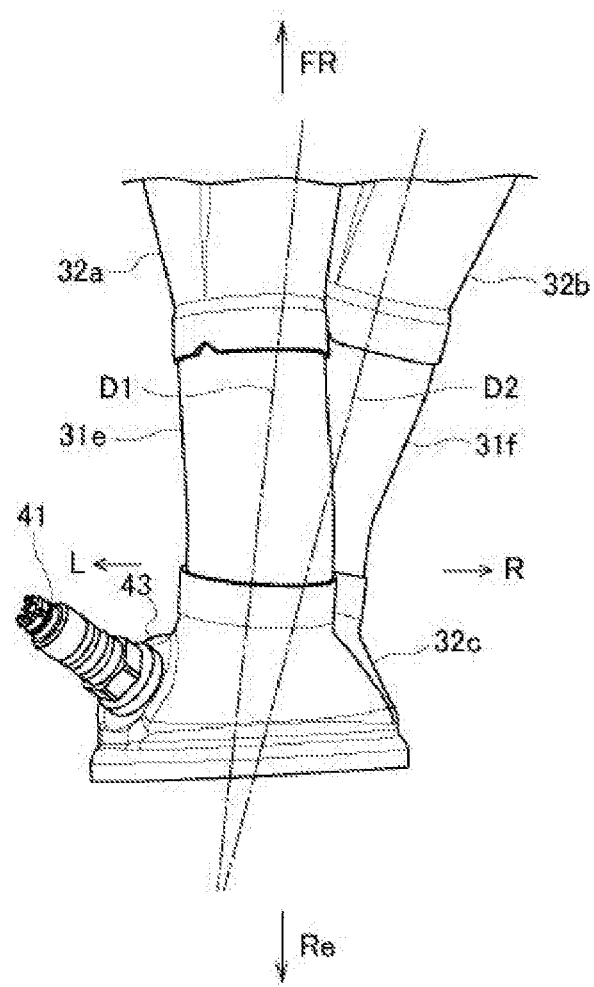
FIG. 9 is a view showing a relationship between an oxygen sensor and an exhaust direction according to a modification.

In the present embodiment, the exhaust pipes 31e, 31f are connected to the collecting pipe 32c such that the exhaust directions D1, D2 of the exhaust pipes 31e, 31f intersect with each other, but the present invention is not limited to thereto. As shown in FIG. 9, the exhaust pipes 31e, 31f may be connected to the collecting pipe 32c such that the exhaust directions D1, D2 of the exhaust pipes 31e, 31f face the oxygen sensor 41. Accordingly, since the exhaust gas flows from the two exhaust pipes 31e, 31f toward the oxygen sensor 41, the detection accuracy of the oxygen concentration of the exhaust gas by the oxygen sensor 41 is improved.

In the present embodiment, the outlets 33e, 33f of the exhaust pipes 31e, 31f are adjacent to each other in the upper-lower direction, and the oxygen sensor 41 is installed on the left side of the outlets 33e, 33f of the exhaust pipes 31e, 31f, but the present invention is not limited thereto. The outlets 33e, 33f of the exhaust pipes 31e, 31f may be positioned in any direction as long as the outlets 33e, 33f are adjacent to each other, and the oxygen sensor 41 may be installed on any side of the outlets 33e, 33f as long as a position of the oxygen sensor 41 is separated from the outlets 33e, 33f in a direction orthogonal to a direction in which the outlets 33e, 33f of the exhaust pipes 31e, 31f are adjacent to each other. For example, the outlets 33e, 33f of the exhaust pipes 31e, 31f may be adjacent to each other in the left-right direction, and the oxygen sensor 41 may be installed above the outlets 33e, 33f of the exhaust pipes 31e, 31f as long as the constraint of the vehicle layout of the motorcycle is satisfied. In addition, the oxygen sensor 41 is not limited to a configuration in which the oxygen sensor 41 is installed at the position separated in the orthogonal direction from the contact portion 39 between the outlets 33e, 33f of the two exhaust pipes 31e, 31f, as long as the oxygen sensor 41 may be installed at a position separated in the orthogonal direction from a formation area of the outlets 33e, 33f.

In the present embodiment, the outer edges of the outlets 33e, 33f of the exhaust pipes 31e, 31f are in contact with each other, and the detection end 42 of the oxygen sensor 41 is positioned on a side of the contact portion 39, but the present invention is not limited thereto. The outlets 33e, 33f of the exhaust pipes 31e, 31f may be separated from each other. The detection end 42 of the oxygen sensor 41 may be positioned at any position as long as the detection end 42 of the oxygen sensor 41 is separated from a portion between the exhaust pipes 31e, 31f in the direction orthogonal to the direction in which the outlets 33e, 33f of the two exhaust pipes 31e, 31f are adjacent to each other in a sectional view.

In the present embodiment, the oxygen sensor 41 is exemplified as the exhaust gas sensor, but the present invention is not limited to this configuration. The exhaust gas sensor may be, for example, an air-fuel ratio sensor that detects the air-fuel ratio of the exhaust gas as long as the sensor is configured to detect the predetermined component of the exhaust gas.

In the present embodiment, a four-cylinder engine is exemplified as the engine 20, but the engine 20 may be the multi-cylinder engine. For example, if the engine has three or more cylinders, a plurality of exhaust pipes may be combined into two exhaust pipes and connected to a collecting pipe, and if the engine is a two-cylinder engine, two exhaust pipes may be connected to a collecting pipe.

In the present embodiment, the left side space 45 of the collecting pipe 32c is formed to be larger than the right side space 46, but the present invention is not limited thereto. The two spaces may be formed in any size as long as one space in which the oxygen sensor 41 is installed may be formed to be larger than the other space in which the oxygen sensor 41 is not installed, with the outlets 33e, 33f of the exhaust pipes 31e, 31f interposed therebetween. For example, in a case where the outlets 33e, 33f of the two exhaust pipes 31e, 31f are adjacent to each other in the left-right direction, an upper space in which the oxygen sensor 41 is installed may be formed to be larger than a lower space. In addition, the one space and the other space of the collecting pipe 32c may be formed to have the same size as long as the sufficient detection accuracy of the oxygen sensor 41 is obtained.

In the present embodiment, the inclination of the enlarged diameter portion on the left side of the collecting pipe 32c is formed to be larger than the inclination of the enlarged diameter portion on the right side of the collecting pipe 32c, but the present invention is not limited thereto. The two enlarged diameter portions may be inclined at any angle as long as the inclination of one enlarged diameter portion on which the oxygen sensor 41 is installed may be formed to be larger than the inclination of the other enlarged diameter portion on which the oxygen sensor 41 is not installed, with the outlets 33e, 33f of the exhaust pipes 31e, 31f interposed therebetween. For example, in the case where the outlets 33e, 33f of the two exhaust pipes 31e, 31f are adjacent to each other in the left-right direction, an inclination of an upper enlarged diameter portion on which the oxygen sensor 41 is installed may be formed to be larger than an inclination of a lower enlarged diameter portion. In addition, the inclination of the one enlarged diameter portion and the inclination of the other enlarged diameter portion of the collecting pipe 32c may be the same as long as the sufficient detection accuracy of the oxygen sensor 41 is obtained.

The installation structure of an exhaust gas sensor according to the present embodiment may be appropriately applied to other vehicles in which the exhaust gas sensor is installed, for example, a personal watercraft, a lawn mower, an outboard motor, or the like, in addition to an automatic four-wheel vehicle and a buggy-type motor tricycle.

As described above, the installation structure of an exhaust gas sensor (oxygen sensor 41) according to the present embodiment includes two exhaust pipes (31e, 31f) on a downstream side of a multi-cylinder engine (engine 20), a collecting pipe (32c) configured to collect the two exhaust pipes, and an exhaust gas sensor installed in the collecting pipe. Outlets (33e, 33f) of the two exhaust pipes are connected to the collecting pipe so as to be adjacent to each other. In the collecting pipe, the exhaust gas sensor is installed at a position away from the outlets of the two exhaust pipes in a direction orthogonal to a direction in which the outlets of the two exhaust pipes are adjacent to each other in a sectional view. According to this configuration, since the exhaust gas sensor is separated from both of the two exhaust pipes, only the exhaust gas flowing into the collecting pipe from one exhaust pipe does not hit the exhaust gas sensor, and the biased detection of the exhaust gas from the one exhaust pipe is suppressed. Therefore, the detection accuracy of the predetermined component of the exhaust gas by the exhaust gas sensor can be improved. In addition, since it is not necessary to install the exhaust gas sensor for each exhaust pipe in order to improve the detection accuracy of the exhaust gas sensor, the cost can be reduced.

In the installation structure of an exhaust gas sensor according to the present embodiment, the outlets of the two exhaust pipes are connected to the collecting pipe so as to be adjacent to each other in an upper-lower direction, and in the collecting pipe, the exhaust gas sensor is installed on a side of the two exhaust pipes in the sectional view. According to this configuration, even when the exhaust gas sensor is installed on the side of the collecting pipe in consideration of the minimum ground clearance or the like, the predetermined component of the exhaust gas from both exhaust pipes that are adjacent to each other in the upper-lower direction can be detected by the exhaust gas sensor.

In the installation structure of an exhaust gas sensor according to the present embodiment, in the collecting pipe, the exhaust gas sensor is installed so as not to overlap with the outlets of the two exhaust pipes in the sectional view. According to this configuration, it is possible to prevent only the exhaust gas from one of the exhaust pipes from hitting the exhaust gas sensor. In addition, since the flow of the exhaust gas is not strongly inhibited by the exhaust gas sensor, the pressure loss in the exhaust pipe and the collecting pipe can be reduced.

In the installation structure of an exhaust gas sensor according to the present embodiment, in the collecting pipe, one space (one space 45) is larger than other space (the other space 46) with the outlets of the two exhaust pipes interposed therebetween in the sectional view, and the exhaust gas sensor is installed in the one space. According to this configuration, the exhaust gas from the two exhaust pipes is easily mixed in the one space of the collecting pipe, and the detection accuracy of the predetermined component of the exhaust gas by the exhaust gas sensor can be improved.

In the installation structure of an exhaust gas sensor according to the present embodiment, the collecting pipe has a diameter increasing from an upstream side toward a downstream side, and in the collecting pipe, inclination of one enlarged diameter portion is larger than inclination of other enlarged diameter portion with the outlets of the two exhaust pipes interposed therebetween in the sectional view, and the exhaust gas sensor is installed in the one enlarged diameter portion. According to this configuration, since the one enlarged diameter portion of the collecting pipe is largely inclined, the exhaust gas is diffused toward the exhaust gas sensor, and the detection accuracy of the predetermined component of the exhaust gas by the exhaust gas sensor can be improved.

In the installation structure of an exhaust gas sensor according to the present embodiment, in the collecting pipe, a detection end (42) of the exhaust gas sensor is positioned at a position separated from a portion between the two exhaust pipes in the direction orthogonal to the direction in which the outlets of the two exhaust pipes are adjacent to each other in the sectional view. According to this configuration, since distances from the two exhaust pipes to the detection end of the exhaust gas sensor are substantially equal, the exhaust gas from both of the exhaust pipes uniformly hits the detection end of the exhaust gas sensor, so that the detection accuracy of the predetermined component of the exhaust gas by the exhaust gas sensor can be improved.

In the installation structure of an exhaust gas sensor according to the present embodiment, a detection end of the exhaust gas sensor is positioned on a straight line (L2) extending perpendicularly from a middle point (P) on a center line (L1) connecting centers (O1, O2) of the two exhaust pipes. According to this configuration, since the distances from the two exhaust pipes to the detection end of the exhaust gas sensor become equal, so that the exhaust gas from the two exhaust pipes uniformly hits the detection end of the exhaust gas sensor, and the detection accuracy of the predetermined component of the exhaust gas by the exhaust gas sensor can be improved.

In the installation structure of an exhaust gas sensor according to the present embodiment, exhaust directions (D1, D2) of the two exhaust pipes intersect with each other in a top view. According to this configuration, the exhaust gas from the two exhaust pipes is easily mixed in the collecting pipe, and the detection accuracy of the predetermined component of the exhaust gas by the exhaust gas sensor can be improved. In addition, the connection of the two exhaust pipes to the collecting pipe is improved, and the pressure loss in an exhaust passage can be reduced.

In the installation structure of an exhaust gas sensor according to the present embodiment, exhaust directions of the two exhaust pipes are directed to the exhaust gas sensor in a top view. According to this configuration, since the exhaust gas flows from the two exhaust pipes to the exhaust gas sensor, the detection accuracy of the predetermined component of the exhaust gas by the exhaust gas sensor can be improved.

In the installation structure of an exhaust gas sensor according to the present embodiment, an oil pan (23) configured to store oil is provided at a lower portion of the multi-cylinder engine, a concave portion (52) is formed in the oil pan, the collecting pipe is positioned in the concave portion, and the exhaust gas sensor fits in the concave portion. According to this configuration, even when the two exhaust pipes are installed in the upper-lower direction, it is possible to satisfy constraint of the vehicle layout such as the minimum ground clearance and the bank angle.

Although the present embodiment has been described, as another embodiment, the above embodiment and the modification may be wholly or partially combined.

The technique of the present invention is not limited to the above embodiment, and various changes, substitutions, and modifications may be made without departing from the spirit of the technical idea. Further, the present invention may be implemented by using other methods as long as the technical idea can be realized by the methods through progress of the technique or other derivative technology. Accordingly, the claims cover all embodiments that may be included within the scope of the technical ideas.

What is claimed is:

1. An installation structure of an exhaust gas sensor comprising:
    two exhaust pipes on a downstream side of a multi-cylinder engine;
    a collecting pipe configured to collect the two exhaust pipes; and
    an exhaust gas sensor installed in the collecting pipe,
    wherein outlets of the two exhaust pipes are connected to the collecting pipe so as to be adjacent to each other, and
    wherein in the collecting pipe, the exhaust gas sensor is installed at a position away from the outlets of the two exhaust pipes in a direction orthogonal to a center line connecting centers of the two exhaust pipes so as not to overlap with the outlets of the two exhaust pipes, in a sectional view of the collecting pipe.

2. The installation structure of an exhaust gas sensor according to claim 1,
    wherein the outlets of the two exhaust pipes are connected to the collecting pipe so as to be adjacent to each other in an upper-lower direction, and
    wherein in the collecting pipe, the exhaust gas sensor is installed on a side of the two exhaust pipes in the sectional view of the collecting pipe.

3. The installation structure of an exhaust gas sensor according to claim 1,
    wherein in the collecting pipe, one space is larger than other space with the outlets of the two exhaust pipes interposed therebetween in the sectional view of the collecting pipe, and the exhaust gas sensor is installed in the one space.

4. The installation structure of an exhaust gas sensor according to claim 1,
    wherein the collecting pipe has a diameter increasing from an upstream side toward a downstream side, and
    wherein in the collecting pipe, inclination of one enlarged diameter portion is larger than inclination of other enlarged diameter portion with the outlets of the two exhaust pipes interposed therebetween in the sectional view of the collecting pipe, and the exhaust gas sensor is installed in the one enlarged diameter portion.

5. The installation structure of an exhaust gas sensor according to claim 1,
    wherein in the collecting pipe, a detection end of the exhaust gas sensor is positioned at a position separated from a portion between the two exhaust pipes in the direction orthogonal to the direction in which the outlets of the two exhaust pipes are adjacent to each other in the sectional view of the collecting pipe.

6. The installation structure of an exhaust gas sensor according to claim 1,
    wherein a detection end of the exhaust gas sensor is positioned on a straight line extending perpendicularly from a middle point on the center line connecting the centers of the two exhaust pipes.

7. The installation structure of an exhaust gas sensor according to claim 1,
    wherein exhaust directions of the two exhaust pipes intersect with each other in a top view.

8. The installation structure of an exhaust gas sensor according to claim 1,
    wherein exhaust directions of the two exhaust pipes are directed to the exhaust gas sensor in a top view.

9. The installation structure of an exhaust gas sensor according to claim 1,
    wherein an oil pan configured to store oil is provided at a lower portion of the multi-cylinder engine, and
    wherein a concave portion is formed in the oil pan, the collecting pipe is positioned in the concave portion, and the exhaust gas sensor fits in the concave portion.

10. The installation structure of an exhaust gas sensor according to claim 9,
    wherein the two exhaust pipes are connected to the collecting pipe at the concave portion.

* * * * *